United States Patent [19]
McNeel

[11] B 3,993,859
[45] Nov. 23, 1976

[54] FLUID-TIGHT ENCLOSURE FOR GEOPHONE AND CABLE

[75] Inventor: William O. McNeel, Houston, Tex.

[73] Assignee: Geo Space Corporation, Houston, Tex.

[22] Filed: July 29, 1974

[21] Appl. No.: 492,902

[44] Published under the second Trial Voluntary Protest Program on February 24, 1976 as document No. B 492,902.

[52] U.S. Cl............................ 174/52 R; 339/106; 340/17 R
[51] Int. Cl.² ........................................ G01V 1/16
[58] Field of Search............. 174/52 R; 340/7 R, 17; 339/151 C, 106

[56] References Cited
UNITED STATES PATENTS

| | | | |
|---|---|---|---|
| 1,974,297 | 9/1934 | Benander....................... | 339/106 X |
| 2,908,890 | 10/1959 | Campbell............................ | 340/17 |
| 3,119,978 | 1/1964 | Sears............................. | 174/154 X |
| 3,445,809 | 5/1969 | McLoad.............................. | 340/17 |

Primary Examiner—J. V. Truhe
Assistant Examiner—David A. Tone
Attorney, Agent, or Firm—Daniel J. Meaney, Jr.

[57] ABSTRACT

A rigid, durable, fluid-tight metal enclosure adapted to enclose a cylindrically shaped geophone electrically connected to a cable having a housing formed of a metal and having an open end through which a geophone is inserted and a closed end, a flexible header mounted in the housing at the open end thereof having a pair of conical shaped cable supports extending therefrom in opposite directions adapted to have a cable pass therethrough into a hollowed out central area of the header to be electrically connected to the geophone, the flexible header includes an annular shaped ring member for forming, under a clamping pressure, a fluid-tight seal between an annular shaped ring member and the housing and between the cable supports and cable and having an annular shaped lip member adapted to make yieldable engagement with the top of the geophone, a circular-shaped stress ring having a pair of opposing aligned holes and positioned in the hollowed out central area of the flexible header to enable the cable to be passed therethrough into the central area, the stress ring being capable of retaining within the center thereof the cable having a knot anchored takeout therein to prevent withdrawal of the cable through the flexible header causing an electrical disconnection of the cable from the geophone, a relatively thin electrical insulating sheet and disc insulator located between the interior walls of the housing and the exterior of the geophone, a support stud mounted through an O-ring seal in the closed end of the housing, and a clamping means for forming a clamping pressure between the header and housing.

17 Claims, 14 Drawing Figures

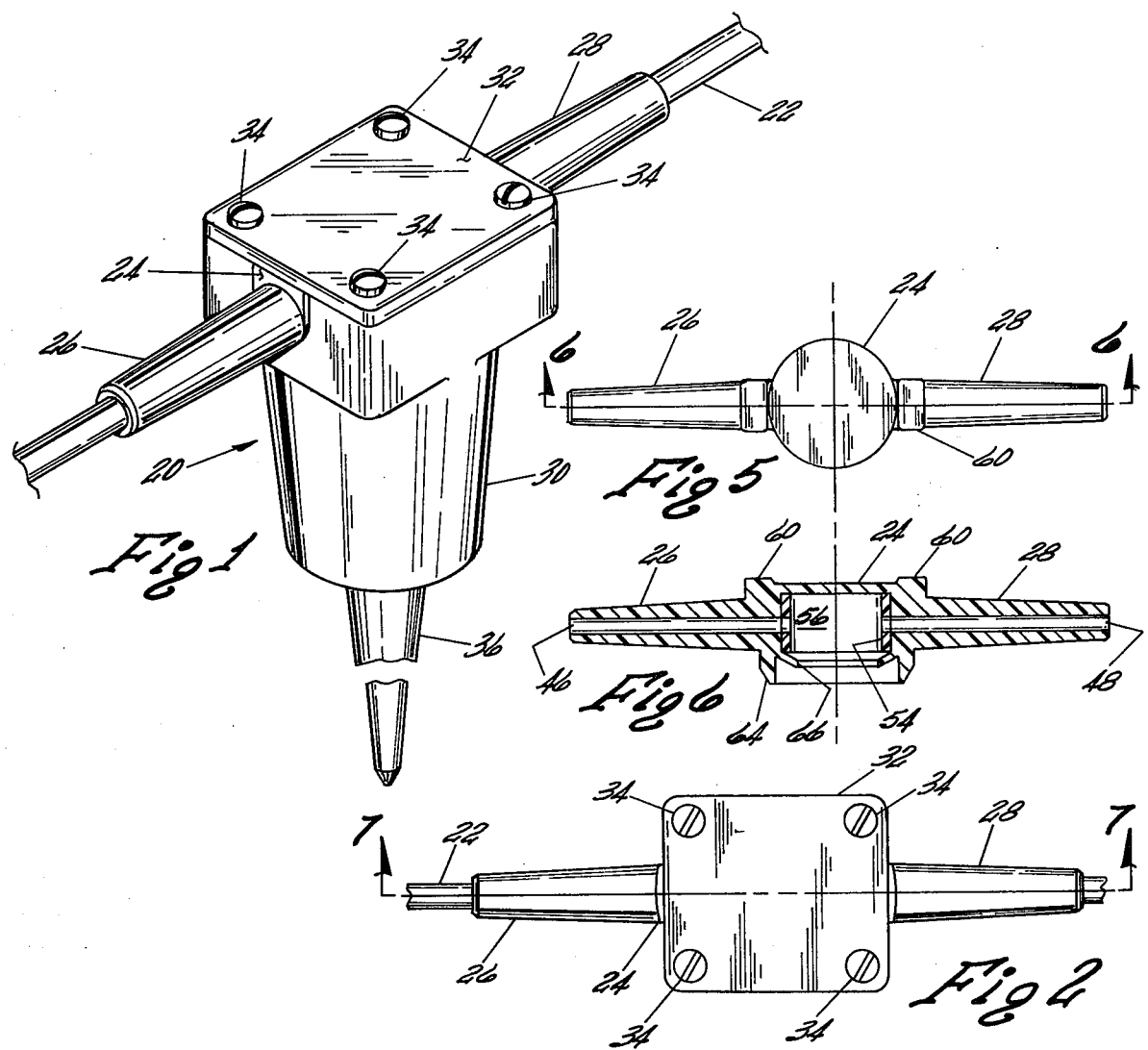
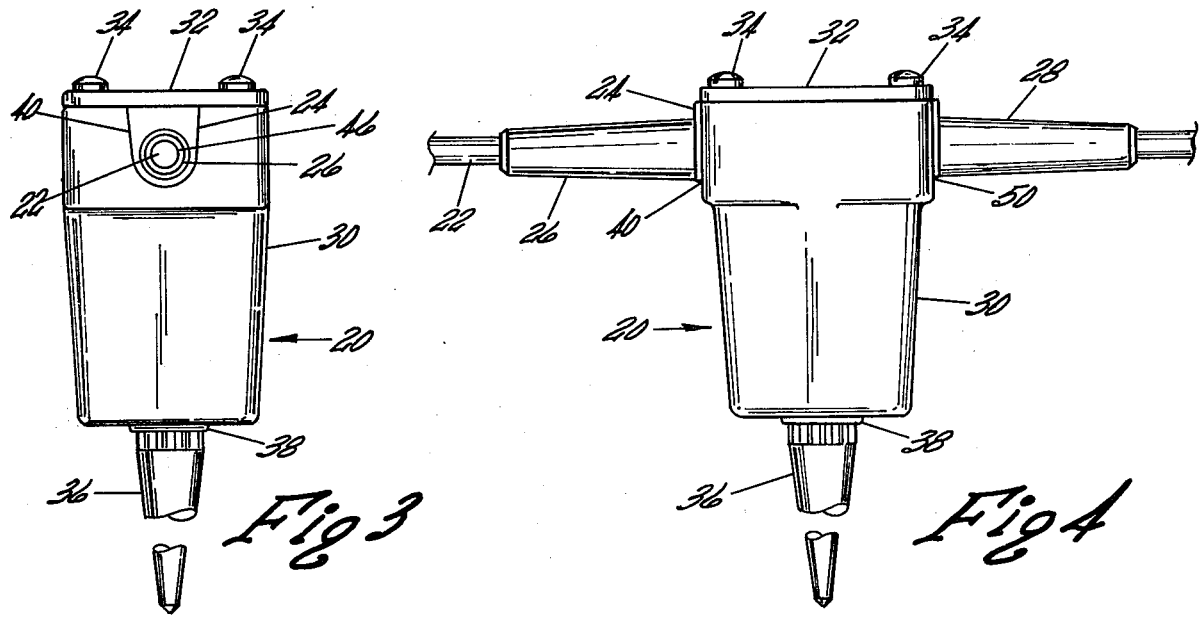

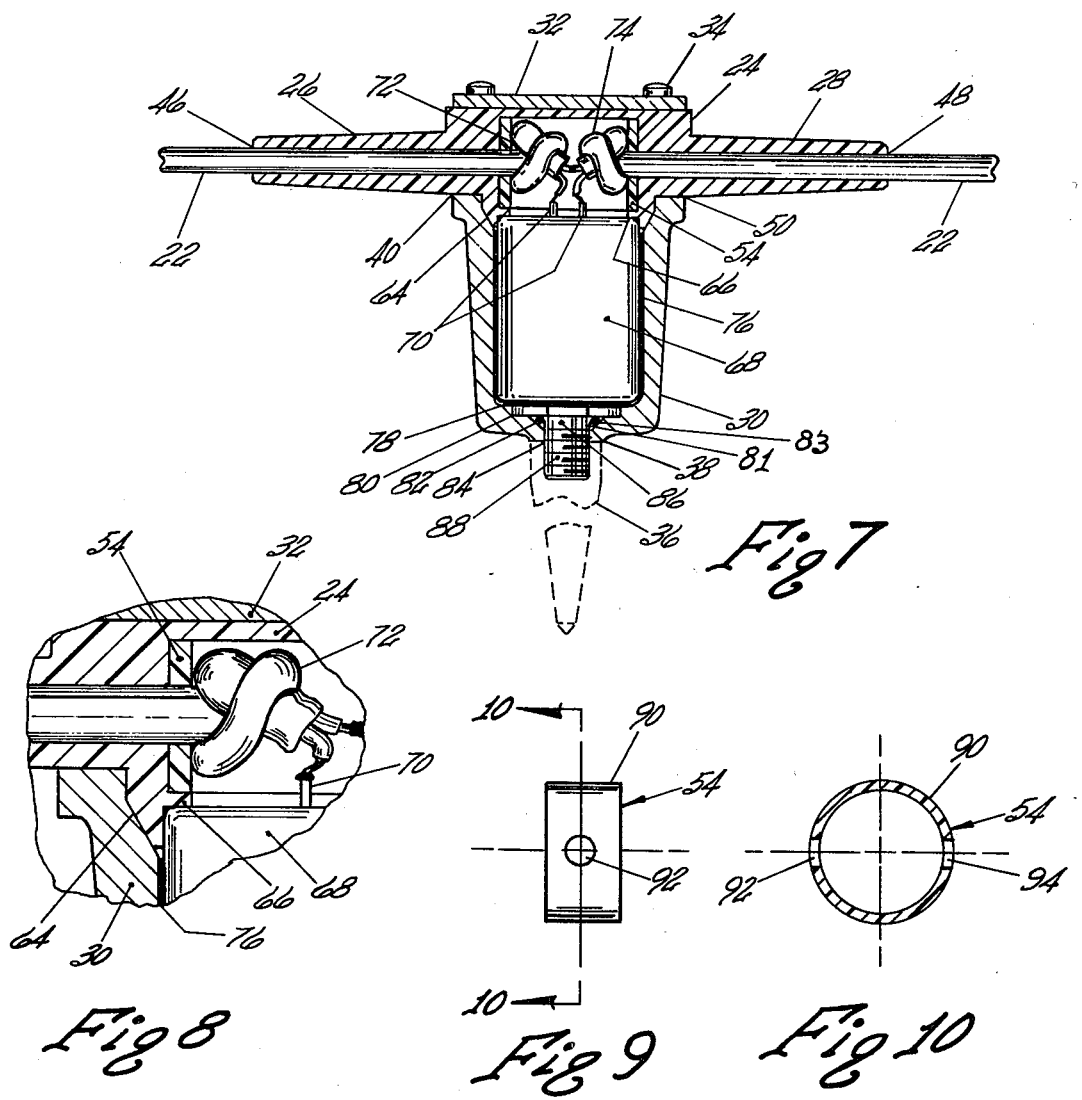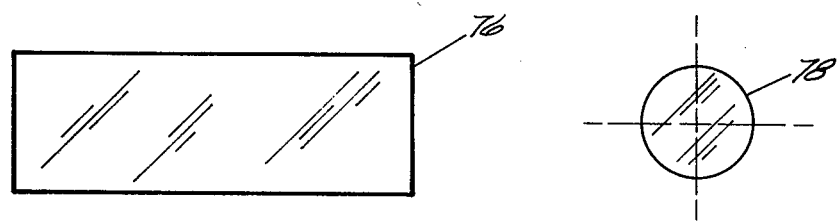

FLUID-TIGHT ENCLOSURE FOR GEOPHONE AND CABLE

BACKGROUND OF THE INVENTION

1. Field of the Invention

This invention relates to a novel and improved fluid-tight, durable metal enclosure for a geophone electrically connected to a cable. In particular, this invention relates to a fluid-tight metal enclosure adapted for use in the seismic industry as a fluid-tight, durable metal enclosure for enclosing a seismometer for detecting seismic waves produced by a seismic energy source in marshes, swamps and other damp and wet geographical locations.

2. Disclosure of the Prior Art

It is known in the prior art to use fluid-tight, high impact polycarbonate (Lexan) cases to enclose or house a geophone which is electrically connected to a cable which passes through the case. Use of a knot-anchored takeout to prevent withdrawal of the cable from the case and disconnection of the cable from the geophone is known and described in U.S. Pat. No. 3,119,978. Known applications using a knot-anchored takeout include a land case or a marsh case wherein the entire case is formed of plastic. In the land case, the top of the case is removable. The removable top is joined to the case with a threaded screw ring or a slip-on ring. Entry of the cable into the case is through the threaded screw or slip-on ring. If desired, the interior of the case can be filled with a silastic material to encapsulate the geophone, cable, the knot-anchored takeout and the electrical connections between the cable and geophones. In the marsh case, the entire case is either an integral housing formed around the geophone and cable or is formed of several major segments which are mechanically joined by a metal band or other fastening means.

The prior art cases have several disadvantages. One disadvantage is that under continuous usage, the water proof seal between the plastic housing and top or housing segments may leak. The plastic material itself is subject to deterioration from sunlight and temperature extremes. In addition, potting components, such as silastic, may be required. Field servicing and repair is sometimes time consuming, difficult and requires special tooling. In some types of cases, the geophone itself may rotate within the case when the case is subjected to rotational force or abrupt movements. The geophone rotation has been known to disrupt, short or otherwise affect the electrical connection between the cable and geophone terminals.

SUMMARY OF THE INVENTION

The present invention overcomes several disadvantages of the prior art. One advantage of the present invention is that a positive fluid-tight waterproof seal is formed between a metal housing, a flexible header and metal top. A positive fluid-tight seal is also formed between a cable, which enters the housing through cable supports in the header, and the housing, by clamping the header between the top and housing and urging the header into an intimate fluid-tight sealing engagement with the cable and housing.

Another advantage of the present invention is that a stress ring located within the housing prevents withdrawal of the cable from the enclosure by forming a stress surface to hold and support the cable and knot-anchored takeout inside the header to prevent disconnection or shorting of the electrical connection between the cable and connecting terminals in the geophone. In addition, the disadvantage of requiring a potting compound is avoided.

One other significant advantage is that the stress ring additionally functions to compress an annular shaped lip member into clamping relationship with top of the geophone. By clamping the lip against the top of the geophone, the geophone is locked in position to prevent rotation thereof within the housing when the entire enclosure is subjected to rotational forces or other abrupt movements. By preventing rotation of the geophone in the enclosure, disruption or disconnection of the cable from the geophone due to such rotational forces or abrupt movements are eliminated.

Another advantage of the present invention is that a thin electrical insulation material can be inserted in the enclosure between the interior walls of the housing and exterior surfaces of the geophone thereby insuring electrical insulation between the metal housing and the geophone case.

In the preferred embodiment, the metal is aluminum. Use of aluminum for the housing and top results in a lightweight, rugged, durable, fluid-tight enclosure.

Another advantage is that the metal housing is capable of having a threaded base stud support mounted therein thereby enabling the user to interchange the type of mounting spikes or bases without damaging the enclosure or fluid-tight seal.

Another advantage of the present invention is that the stress ring urges the geophone against the stud support forming a fluid-tight seal between the stud support, an O-ring and the housing permitting removal of a spike or base without breaking or disrupting the fluid-tight seal.

BRIEF DESCRIPTION OF THE DRAWING

The foregoing and other advantages and features of the invention will be apparent from the following description of the preferred embodiment of the invention when considered together with the illustrations in the accompanying drawing and includes the following features:

FIG. 1 is a perspective view of an assembled fluid-tight enclosure having a cable passing therethrough;

FIG. 2 is a top view of the fluid-tight enclosure shown in FIG. 1;

FIG. 3 is a left end view of the fluid-tight enclosure shown in FIG. 2;

FIG. 4 is a front view of the fluid-tight enclosure shown in FIG. 2;

FIG. 5 is a top view of a flexible header showing the oppositely extending cable supports;

FIG. 6 is a sectional front view of the flexible header taken along section lines 6—6 of FIG. 5;

FIG. 7 is a section of front view of the fluid-tight enclosure taken along section lines 7—7 of FIG. 2;

FIG. 8 is an exploded view of a portion of FIG. 7 showing in greater detail the relationship between the flexible header, stress ring, knot-anchored takeout and top of a geophone encapsulated between the housing and top;

FIG. 9 is a front view of a stress ring;

FIG. 10 is a top sectional view of the stress ring taken along section lines 10—10 of FIG. 9;

FIG. 11 is a front view of a relatively thin, rectangularly shaped insulating material;

FIG. 12 is a front view of a relatively thin, disc shaped insulating material;

Similar numbers refer to similar elements throughout the drawing.

DESCRIPTION OF THE PREFERRED EMBODIMENT

Figure 13:
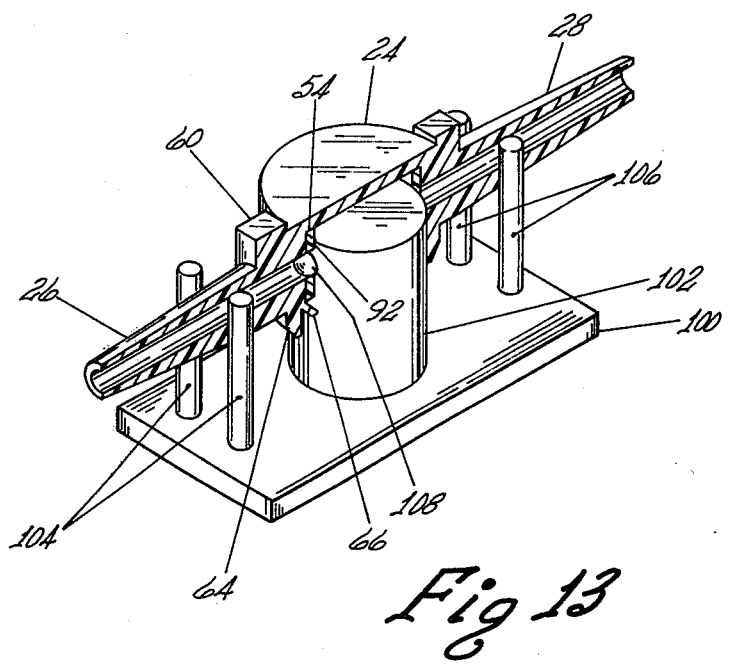
FIG. 13 is a perspective view partially in cross-section illustrating a jig for assembling the stress ring within the flexible header.

FIG. 1 discloses a rigid, durable metal enclosure generally designated as 20 which is adapted to encapsulate a cylindrical shaped geophone (visible in FIG. 7) which is electrically connected to a cable 22. The cable 22 passes through the enclosure 20 through a flexible header 24. Flexible header 24 has cable entry means such as, for example, a pair of conical shaped cable supports 26 and 28 respectively extending therefrom. The flexible header 24 is mounted in the open end of a metal housing 30. The flexible header 24 is integrally mounted within the housing 30 and is clamped thereagainst by means of a metal top 32. Metal top 32 is connected to the housing 30 by means of fasteners such as, for example, screws 34. A spike or base, generally designated as 36, is connected to a hex shaped stud support (visible in FIG. 7) extending through a boss 38 (FIG. 3) at the closed end of the housing 30.

FIG. 2 is a top view of the enclosure showing the relationship between the cable 22 which enters the housing 20 through the cable supporters 26 and 28 of the flexible header 24. In this embodiment, the generally square shaped metal top 32 is used as the means for developing a clamping pressure for urging the header 24 into intimate fluid-tight engagement with the housing 30 and cable 22. The four screws 34 are located at each corner of the generally square top 32. Accordingly, a generally uniform clamping pressure is provided at each corner and along the periphery of the metal top 32 insuring a uniform clamping pressure on header 24. This results in a clamping pressure between the cable supports 26 and 28 and outer surface of the cable 22.

FIG. 3 is a left end view of the enclosure 20 of FIG. 2 showing the relationship between the housing 30, flexible header 24 and metal top 32. The housing has a generally U-shaped opening on each side thereof, for example opening 40 on the left side of housing 30. In FIG. 3, the cable supporter 26 is shown to have an aperture 46 to receive cable 22 which enters the housing 30 through U-shaped opening 40. In FIG. 3, the spike 36 is detachably screwed to a hex shaped stud support which is completely enclosed by boss 38.

FIG. 4 is a front view of the enclosure showing the relationship between the housing 30, the flexible header 24 and the top 32. In particular, FIG. 4 illustrates that the cable support 26 of flexible header 24 enters the housing 30 by U-shaped opening 40 and the cable support 28 of the flexible header 24 enters the housing 30 by U-shaped opening 50.

FIG. 5 and FIG. 6 show the flexible header 24 in greater detail. In addition, FIG. 6 illustrates the relationship between flexible header 24 and a stress ring 54.

FIG. 5 is a top view of the flexible header 24. The main body of header 24 is generally circular in shape and has a hollowed out central area 56 as shown in FIG. 6. In the preferred embodiment, the header 24 is formed of a black, urethane elastomer having a hardness of about 86 durometers on the Shore A scale.

The header 24 has a pair of conical shaped cable supports 26 and 28 extending in opposite directions from the hollowed out central area 56. Each cable support 26 and 28 has an aperture extending therethrough designated as 46 and 48 respectively. Each aperture 46 and 48 is in axial alignment with the other and has a cross-section that approximates the cross-section of the cable 22 to be connected to a geophone. The hollowed out central area has a dimension of sufficient size to enclose the cable ends, each of which has a knot-anchored takeout formed therein, such as shown in FIG. 7.

Each cable support 26 and 28 has a rectangular shaped sealing land 60 at the top thereof to permit a tight sealing engagement between the header 24 and metal top 32.

The header 24 also has a resilient sealing edge, such as, for example, an annular shaped ring member 64 which is adapted to communicate with the open end of the housing 30. In addition, a separate annular shaped lip member 66 is located interior of the annular ring 64 and below the hollowed out central area 56. The annular shaped ring member 64 is of sufficient dimension to sealably engage the housing 30 and is capable of forming a fluid-tight seal therebetween when the header 24 is urged into pressure contact with the open end of housing 30.

FIG. 6 shows a circular shaped stress ring 54 having a thin outer wall and having an overall dimension which is slightly less than the dimension of the hollowed out central area 56. The stress ring 54 has a pair of aligned opposing holes formed through the thin outer wall. The stress ring 54 and the aligned holes therein are illustrated in greater detail in FIGS. 9 and 10. The stress ring 54 is positioned within the hollowed out central area 56 with the opposing holes axially aligned with and in communication with the apertures 46 and 48 in the cable supports 26 and 28 of header 24.

FIG. 7 is a sectional front view showing an assembled enclosure. The housing 30 has an open end and a closed end. The interior dimensions of the housing 30 are determined by the size of the geophone to be enclosed thereby. The header 24 and stress ring 54 are assembled in a separate step. The cable 22 passes through the header 24 via apertures 46 and 48 in cable supports 26 and 28, respectively. The cable ends are tied into knot-anchored takeouts 72 and 74. The knot-anchored takeouts 72 and 74 prevent withdrawal of the cable 22 through the header 24 due to a tension or pulling force. Absent the stress ring 54, the knot-anchored takeouts 72 and 74 could result in separation of the cable 22 from the geophone 68 and rupture of the fluid seal between the interior of apertures 46 and 48 and exterior surface of cable 22.

The severed ends of cable 22 are stripped and electrically connected to terminals 70 of geophone 68. In this embodiment the geophone has been rotated about 30° from a plane perpendicular to the axis of the axially aligned apertures 46 and 48. The stress ring 54 functions to support the cable 22 and knot-anchored takeouts 72 and 74 off the top of the terminals 70 and within the interior of the stress ring 54. The combination of the stress ring 54 and knot-anchored takeouts 72 and 74 eliminate stress or strain from being applied to or transmitted to the terminals 70. Thus, the stress ring 54 prevents the cable 22 from being electrically disconnected from terminals 70 due to a tension or pulling force.

The header 24 is mounted into the open end of housing 30 with the annular shaped ring member 64 intimately engaging the interior of the open end of housing 30. The annular shaped lip member 66 is urged slightly upward from its relaxed position, as shown in FIG. 6, to a compressed position between the lower outer edge of stress ring 54 and the top of geophone 68. The metal top 32 is positioned on top of header 24 and has apertures therein to receive screws 34. The housing 30 is drilled and tapped to receive the ends of screws 34.

The geophone 68 is enclosed within the housing 30. Electrical insulating means, such as, for example, a relatively thin sheet of mylar, is positioned between the exterior of the geophone 68 and interior housing 30. In this embodiment, two separate pieces of insulation are used. At this point, reference to FIGS. 11 and 12 is appropriate to disclose the details of the insulating material.

FIG. 11 shows a rectangular shaped insulating sheet 76 having a side dimension substantially equal to the axial height of geophone 68. The length of the sheet 76 is substantially equal to the circumference of the exterior surface of the geophone. The sheet 76 is wrapped or wound around the geophone and inserted into the housing 30 positioning the insulating sheet 76 between the geophone 68 and housing 30 as illustrated in FIG. 7.

FIG. 12 shows disc insulator 78 having a diameter which substantially equals the diameter of geophone 68. The disc insulator 78 is first positioned into the closed end of housing 30 and the geophone 68 is then inserted into the housing 30 through the open end.

In the preferred embodiment, the insulating materials shown in FIGS. 11 and 12, insulating sheet 76 and disc insulator 78 are formed from mylar having a thickness in the order of .004 inches to .005 inches.

Referring back to FIG. 7, the closed end of housing 30 has a small cavity 80 formed in the end thereof and an aperture 84 extending from cavity 80 through boss 38. The cavity 80 is formed of two areas; namely, a first recessed area having a dimension to receive a flat planar surface of a hex shaped stud bolt 86 resulting in a flat planar closed end in housing 30, and a second recessed area for receiving and enclosing a resilient annular shaped sealing member such as, for example, an O-ring member 82. O-ring member 82 is positioned around a curved surface 81 formed between the underside of the flat planar surface of stud bolt 86 and housing 30. The radius of the curved surface 81 is formed so as to permit the O-ring member 82 to fit snugly around the unthreaded portion of the stud bolt 86 while making intimate contact with the curved surface 81 of the underside of the flat planar end of stud bolt 86 and a slanted surface 83 of the second recessed area in housing 30. The O-ring 82 is selected to have a cross-sectional dimension enabling the surface thereof to make simultaneous sealing engagement with both the curved surface 81 and the slanted surface 83. In the preferred embodiment, the O-ring is formed of a neoprene compound, having a hardness of about 80 durometers on the Shore A scale, such as, for example, a type 2011 Parco O-Ring, C-557-7, sold by Plastic and Rubber Product Company of Ontario, Calif. The threaded end 88 of stud bolt 86 extends through aperture 84 and boss 38 and is of sufficient length to receive a spike as depicted by dashed lines 36.

The enclosure, when assembled, is rendered fluid-tight in the following manner. Screws 34 are tightened, establishing a clamping force between metal top 32 and housing 30. The clamping force urges the top of header 34, and particularly the lands 60, downward toward the top of housing 30. The cable supports 26 and 28 are urged into fluid-tight intimate contact with the exterior of the cable 22. The annular ring 64 is urged or forced into fluid-tight engagement with the open end of housing 30. The header 24, in response to the clamping pressure, concurrently pushes the stress ring 54 against the annular shaped lip member 66 which, in turn, pushes the entire geophone 68 into intimate contact with the disc insulator 78. This clamping force causes the geophone 68, through the disc insulator 78, to drive the flat planar end of stud bolt 86 against O-ring 82 forming a fluid-tight seal therebetween.

The threaded end 88 of stud bolt 86 is then capable of receiving or interchanging bases or spikes without breaking or disrupting the fluid-tight seal. One example of a spike is a conical shaped member with point as illustrated by dashed lines 36. One example of a base is flat planar disc with a tapped aperture (not shown) which can be threaded onto threaded end 88 of stud bolt 86.

The stress ring 54, when clamped against annular shaped lip member 66 performs an additional function of locking the geophone 68 in position. When the fluid-tight enclosure is exposed to rotational forces or other forces, the pressure applied by the stress ring 54, through the annular shaped lip member 66 is sufficient to prevent the geophone 68, as a unit, from moving or rotating within the housing.

FIG. 8 shows in greater detail the stress ring 54 in relation to the metal top 32, the header 24, the knot-anchored takeout 72, the annular shaped ring member 64 and the annular shaped lip member 66. The outer diameter of the stress ring 54 in this embodiment is substantially equal to that of the geophone 68. If the diameter of the stress ring 54 is smaller than that of the geophone, the length of the annular shaped ring member would need to be increased. Alternatively, other methods could be used to lock the geophone in position. One example would be to provide a surface on the edge of the stress ring 54 which has sufficient surface friction to prevent rotation of the geophone 68 from external forces as described. In this example, the edge of the stress ring would directly contact the top of the geophone 68. The annular shaped lip member 66 would then be eliminated.

FIGS. 9 and 10 show the stress ring 54 in greater detail. FIG. 9 illustrates the thin outer wall 90 and one aperture 92. FIG. 10 illustrates a sectional top view of the stress ring 54 showing the relatively thin wall 90 and the pair aligned opposing holes 92 and 94. The preferred material for the stress ring 54 is nylon. In the preferred embodiment, the stress ring outer walls had a thickness in the order of about 0.070 inches. However, the stress ring 54 may be formed of other plastic or metal material. Of importance is that the stress ring 54 maintains rigidity under pressure while providing a durable stress surface to withstand the high density stress forces developed by the knot-anchored takeouts pressing thereagainst in response to tension or pulling forces.

FIG. 13 illustrates apparatus for performing the method of inserting the stress ring 54 into the header 24. The apparatus has a base 100 and a cylindrically shaped mounting core 102. The base 100 has two sets of mounting pins 104 and 106 extending therefrom which are used to guide the cable supports 26 and 28 into proper position, relative to the mounting core 102. The purpose of the pins is to provide proper alignment of the apertures in the cable supports with the holes of the stress ring. The mounting core 102 has a pair of oppositely positioned, spring loaded ball bearings, one of which is shown as ball bearing 108. The ball bearing 108 is spaced from the top of the mounting core 102 a sufficient distance to accommodate a stress ring 54, which is placed thereon. The cross-sectional dimension of the mounting core 102 is such that the stress ring 54 can be slipped thereon to a point where the spring loaded ball bearing snaps into the aligned opposing holes 92 and 94 removably holding the stress ring 54 in place. Thereupon, the header 24 is forced over the stress ring 54 such that the pins 104 and 106, which are aligned relative to the ball bearings in mounting core 102, cause the apertures in cable supports 26 and 28 to be aligned with the holes in the stress ring 54. The assembled header-stress ring sub-assembly is then snapped off the mounting core 102.

Figure 14:
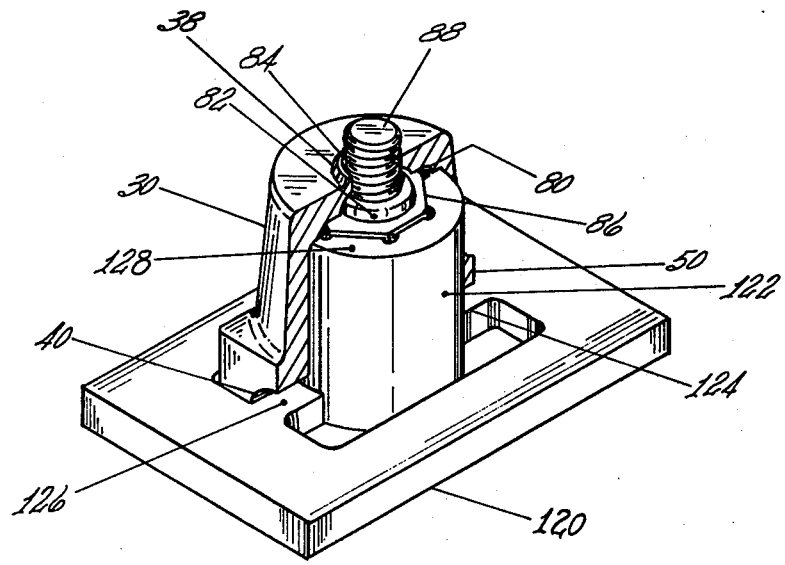
FIG. 14 is a perspective view partially in cross-section illustrating a jig for assembling a stud support in the housing of the enclosure.

FIG. 14 illustrates an apparatus for practicing the method of mounting the hex shaped stud bolt 86 in the aperture 84 of housing 30. The apparatus includes a base plate 120 having two ribs 124 and 126 formed therein. A mounting core 122 extends from the base 120 and is of a length and diameter to have the housing 30 slipped thereon with the header-cable support opening 40 and 50 positioned over the two ribs 124 and 126 respectively. The top 128 of the mounting core 122 has a recess for receiving the flat planar end of stud bolt 86.

The assembly steps are to mount an O-ring 82 onto the underside of the flat planar end of stud bolt 86. The flat planar surface is inserted into the recessed end of top 128 in mounting core 122. The housing 30 is then dropped onto the mounting core 122 and the threaded end 88 is guided through aperture 84 extending through boss 38. A spike (not shown) is then screwed on the threaded end 88. The housing-stud bolt-O-ring and spike assembly is then lifted off the mounting core 122.

Some applications do not require a stud bolt. In such applications, the closed end of housing 30 is formed of a flat planar surface for receiving the disc insulator and geophone. Also, other variations of inserting the stud bolt in the housing are possible.

The fluid-tight metal enclosure of the embodiment described herein is capable of use with seismic sensors manufactured by Geo Space Corporation of Houston, Texas, such as, for example, a digital grade geophone generally known as a GSC Model 20D Digiphone. The fluid-tight enclosure has utility as a metal land case or a marsh case for use in wet or marsh environments. Use under water is possible provided the fluid-tight seal is capable of withstanding pressures in excess of 14 psi. Some embodiments of the present invention have been tested under water at pressures in the order of 30 psi.

In the event that the fluid-tight enclosures must be disassembled in the field, for example to replace a defective geophone, the enclosure is field serviceable. In such event, the enclosure can be easily disassembled, the geophone replaced or other items repaired or replaced and the enclosure re-assembled without requiring molding apparatus, potting compound or special tooling.

What is claimed is:

1. A fluid-tight enclosure adapted to encase a geophone electrically connected to a cable comprising
    a housing means having an open end and inner walls defining a cavity adapted to receive a said geophone;
    a flexible sealing means positioned in the open end of said housing and having a hollowed out central area and cable entry means adapted to have a said cable extended therethrough into the hollowed out central area to be electrically connected to a said geophone, said flexible sealing means having a resilient sealing edge located on the surface of the flexible sealing means for forming a fluid-tight sealing engagement with said housing means;
    a stress ring having a relatively thin outer wall and a pair of aligned opposing holes extending through said thin outer wall, said stress ring being positioned within the hollowed out central area of said flexible sealing means and having the opposing holes thereof in alignment with the cable entry means enabling a said cable to extend therethrough into the hollowed out central area, said stress ring having an inner diameter to enclose a knot-anchored takeout formed in said cable and to support a knot-anchored takeout and a cable in a substantially fixed position thereagainst to prevent withdrawal of a said cable from said stress ring through said flexible sealing means;
    insulating means positioned in engagement with the inner walls of said housing means to electrically insulate the housing means from the exterior of a said geophone; and
    means clamping said flexible sealing means into intimate fluid-tight contact with said housing means and fluid-tight contact between the cable entry means and a said cable extending therethrough forming a pressured fluid-tight seal between said flexible sealing means and said housing means and between the outer periphery of said sealing means and said cable and for urging said stress ring against a said geophone to prevent movement thereof in the cavity of said housing means.

2. The enclosure of claim 1 further comprising
    said housing means having a closed end at the opposite end of the cavity from the open end, said closed end having a recessed area formed therein and an aperture extending therethrough;
    support mounting means positioned within said recessed area of the housing means and extending through said aperture; and
    resilient sealing means mounted between said recessed area of said housing and said support mounting means for forming a pressured fluid-tight seal therebetween.

3. The enclosure of claim 2 wherein the insulating means comprises a rectangular shaped insulating sheet formed around the interior walls of said housing and adapted to be positioned between the interior walls of said housing and the periphery of a said geophone; and
    a disc insulator inserted into the closed end of the housing and adapted to be positioned between the closed end of the housing and the bottom of a said geophone.

4. The enclosure of claim 1 wherein the flexible sealing means comprises a circular-shaped central area defining the hollowed out central area;

an annular shaped ring member forming the sealing edge;

a pair of conical shaped cable supports extending from said central-shaped area forming said cable entry means, each of said cable supports having an aperture therethrough substantially in axial alignment with the aperture of the other cable support; and an annular shaped lip member adapted to be compressed between the stress ring and to a said geophone in the cavity of said housing means.

5. The enclosure of claim 1 further comprising said housing means having a plurality of tapped apertures at the open end thereof; and wherein said clamping means comprises a metal top positioned to engage the open end of the housing with the flexible sealing means therebetween and having a plurality of apertures therein in alignment with the tapped apertures in said housing; and a plurality of screws mounted in the apertures of said top and extending into said tapped apertures, said screws being capable of providing a clamping force as said screws are advanced into said tapped apertures.

6. A rigid, durable enclosure adapted to enclose a cylindrically shaped geophone electrically connected to a cable, said enclosure comprising a metal housing having an open end and a closed end, said housing having an interior cavity for receiving said geophone capable of being inserted therein through the open end;

a flexible header having a hollowed out central area therein and a pair of conical shaped cable supports extending in opposing directions therefrom, each of said cable supports having an aperture therethrough substantially in axial alignment with the aperture of the other cable support, said apertures having a cross-sectional dimension that approximates the cross-section of a said cable adapted to be electrically connected to a said geophone, said hollowed out central area having a dimension to enclose at least one knot-anchored takeout formed in a said cable, said header having an annular shaped ring member adapted to communicate with the open end of said housing and an annular shaped lip member adapted to communicate with top of a said geophone, said annular shaped ring member being capable of forming a fluid-tight seal with said housing in response to said flexible header being urged into pressure contact with said housing;

a circular shaped stress ring having a thin outer wall and a diameter which is slightly less than the diameter of the hollowed out central area of said header, said stress ring having a pair of aligned opposing holes formed through the thin wall, said stress ring being positioned within said hollowed out central area of said header with the holes thereof axially aligned with and in communication with the apertures extending through said cable supports;

electrically insulating means positioned in engagement with the interior of said housing to electrically insulate the exterior of a said geophone from said housing;

a support stud having one generally planar end, said stud being positioned within the aperture at the closed end of said housing with the top surface of the generally planar end in intimate contact with said electrical insulating means and the opposite surface of the generally planar end in contact with the inner surface of the closed end of the housing, said support stud extending through said aperture of the closed end to the exterior of said housing;

a resilient annular shaped sealing member positioned between said opposite side of the generally planar end and said housing for forming a fluid-tight seal therebetween in response to said geophone and said electrically insulating means urging the generally planar end of the stud support into intimate contact with said housing;

a metal top having a cross-section which is substantially the same as a cross-section of the open end of said housing and positioned in contact with the top of flexible header and the open end of said housing; and means for clamping said top, said flexible header and said housing into an integral structure urging said annular shaped ring member into intimate contact with the periphery of the open end of said housing forming a fluid-tight seal therebetween and urging said stress ring into compression engagement with said annular shaped lip member against the top of said geophone thereby urging said geophone and said electrically insulating means into pressure contact with the generally planar end of said stud urging the opposite side of said generally planar end into an intimate sealing contact with said resilient annular shaped sealing member and said closed end of the housing forming a fluid-tight seal therebetween.

7. The enclosure of claim 6 wherein the flexible header is formed of a urethane elastomer having a hardness of about 86 durometers on the Shore A scale.

8. The enclosure of claim 6 wherein the stress ring is formed of nylon having a thickness in the order of about 0.070 inches.

9. The enclosure of claim 6 wherein the electrically insulating means comprises a rectangular insulating sheet having a side substantially equal to the axial height of a said geophone and a length substantially equal to the circumference of the exterior surface of a said geophone, said insulating sheet being formed around the interior of the housing and adapted to be positioned between the interior of the housing and the exterior of a said geophone; and a disc insulator having a diameter substantially equal to the diameter of a said geophone, said disc insulator being inserted into the closed end of the housing and adapted to be positioned between the closed end of the housing and the bottom of a said geophone.

10. The enclosure of claim 9 wherein the insulating sheet and the disc insulator are formed of mylar and have a dimension in the order of 0.004 inches to 0.005 inches.

11. The enclosure of claim 6 wherein the resilient annular shaped sealing member is an O-ring.

12. The enclosure of claim 11 wherein the O-ring is formed of a neoprene compound having a hardness of about 80 durometers on the Shore A scale.

13. The enclosure of claim 6 wherein the clamping means are screws.

14. The method of assembling a fluid-tight enclosure comprising the steps of inserting a stress ring into the interior of a hollowed out central area of a flexible header;

threading a cable through the cable supports of the flexible header and the pair of opposing aligned holes of the stress ring into a hollowed out central area of the flexible header;

forming a knot-anchored takeout in the cable in front of each hole in the stress ring;

electrically connecting the cable to a geophone;

inserting a stud bolt into a housing means having a closed end defining a recessed area and aperture positioning an O-ring seal therebetween with the thread end of said bolt extending therefrom through said aperture;

screwing a spike onto the threaded end of the stud bolt;

positioning electrical insulation into engagement with the interior walls and closed end of the housing means;

inserting the geophone electrically connected to the cable into the housing means holding the electrical installation therebetween;

mounting the flexible header onto the open end of the housing means positioning a sealing annular shaped ring member of the header in contact with the open end of the housing;

placing a top onto the open end of the housing means with the flexible header therebetween; and attaching the top to the housing means with screws forming a fluid-tight seal between the flexible header and housing means and between the cable supports and exterior of the cable while concurrently urging the stress ring into compression contact with an annular shaped lip member of the flexible header to lock the geophone in position and urging the flat planar head into fluid-tight sealing relationship with the O-ring and recessed area of housing means.

15. A flexible header and stress ring assembly for use in making an electrical connection between a geophone electrically connected to a cable, said cable having a knot-anchored takeout formed therein, comprising a flexible sealing means having
a hollowed out central area; and
a cable entry means adapted to have a cable extended therethrough into the hollowed out central area to be electrically connected to a geophone, said flexible sealing means having a resilient sealing edge located on the surface of the flexible sealing means and adapted to intimately engage the interior surface of an open end of a housing adapted to receive a said geophone for forming a fluid-tight sealing engagement with a said housing; and a stress ring having
a relatively thin outer wall; and
a pair of aligned opposing holes extending through said thin outer wall;

said stress ring being positioned within the hollowed out central area of said flexible sealing means and having the opposing holes thereof in alignment with the cable entry means enabling a said cable to extend therethrough into the hollowed out central area;

said stress ring having an inner diameter to enclose a knot-anchored takeout formed in a said cable and to support a knot-anchored takeout and cable in a substantially fixed position thereagainst to prevent withdrawal of a said cable from said stress ring through said flexible sealing means.

16. The assembly of claim 15 wherein said cable entry means comprise a pair of conical shaped cable supports extending in opposite directions therefrom, each of said cable supports having an aperture therethrough substantially in axial alignment with the aperture of the other cable support, said apertures having a cross-sectional dimension that approximates the cross-section of a said cable adapted to be electrically connected to a said geophone.

17. The assembly of claim 16 wherein said flexible sealing means includes an annular shaped ring member adapted to communicate with the open end of a said housing; and an annular shaped lip member adapted to communicate with the top of a said geophone;

said annular shaped ring member being capable of forming a fluid-tight seal with a said housing in response to said flexible header being urged into pressure contact with said housing.

* * * * *